United States Patent [19]

Dotto

[11] 3,716,098

[45] Feb. 13, 1973

[54] AUTOMOTIVE APPARATUS

[76] Inventor: Gianni A. Dotto, 3005 Claar Avenue, Dayton, Ohio 45429

[22] Filed: Jan. 28, 1971

[21] Appl. No.: 110,667

Related U.S. Application Data

[60] Continuation of Ser. No. 794,454, Nov. 15, 1968, abandoned, which is a division of Ser. No. 473,542, June 3, 1965, abandoned.

[52] U.S. Cl. .......... 165/80
[51] Int. Cl. .......... F28f 7/00
[58] Field of Search .......... 165/80

[56] References Cited

UNITED STATES PATENTS

| | | | |
|---|---|---|---|
| 2,984,774 | 5/1961 | Race | 165/80 |
| 3,229,757 | 1/1966 | Root et al. | 165/80 |
| 3,462,553 | 8/1969 | Spranger | 165/80 |

FOREIGN PATENTS OR APPLICATIONS

| | | | |
|---|---|---|---|
| 768,103 | 2/1957 | Great Britain | 165/80 |

*Primary Examiner*—Charles Sukalo
*Attorney*—Richard H. Childress and Robert F. Meyer

[57] ABSTRACT

A semiconductor ignition apparatus including semiconductor means and a rotary capacitance means and inductance means wherein the rotary capacitor means and the inductance means cooperates to apply a determined value of reverse voltage to the semiconductor means when the capacitance value of the rotary capacitor means attains a determined value the semiconductor means is biased to non-conduction.

3 Claims, 20 Drawing Figures

INVENTOR.
GIANNI A. DOTTO

INVENTOR.
GIANNI A. DOTTO

INVENTOR.
GIANNI A. DOTTO

INVENTOR.
GIANNI A. DOTTO

AUTOMOTIVE APPARATUS

This is a continuation of application Ser. No. 794,454 filed Nov. 15, 1968 which in turn is a division of Ser. No. 473,542, filed June 3, 1965.

This invention relates to automotive apparatus. The invention relates more particularly to ignition control apparatus for an internal combustion engine.

It is an object of this invention to provide ignition control apparatus by which higher efficiency operation of an internal combustion engine can be obtained than is possible with any known ignition control system.

Another object of this invention is to provide ignition control apparatus which provides consistent operation in the production of a high voltage, high current spark in a combustion chamber of an internal combustion engine during any speed or load in the engine operation.

Another object of this invention is to provide ignition control apparatus which thus makes possible a very small amount of waste gases from the exhaust of the engine.

Another object of this invention is to provide circuit means by which a silicon controlled rectifier can be employed as a switching member in a circuit having an inductive load capable of producing high energy values.

Another object of this invention is to provide ignition apparatus which has a minimum number of moving parts and which has a minimum number of parts which are subject to wear or the like.

Another object of this invention is to provide such ignition apparatus which can be produced at relatively low cost.

Other objects and advantages reside in the construction of parts, the combination thereof, the method of manufacture, and the mode of operation, as will become more apparent from the following description.

FIGS. 5, 6, 7, 8, 9, and 10 are schematic wiring diagrams of modifications of ignition control apparatus of this invention.

Figures 11, 12, 13, 14A, 14B, 14C:
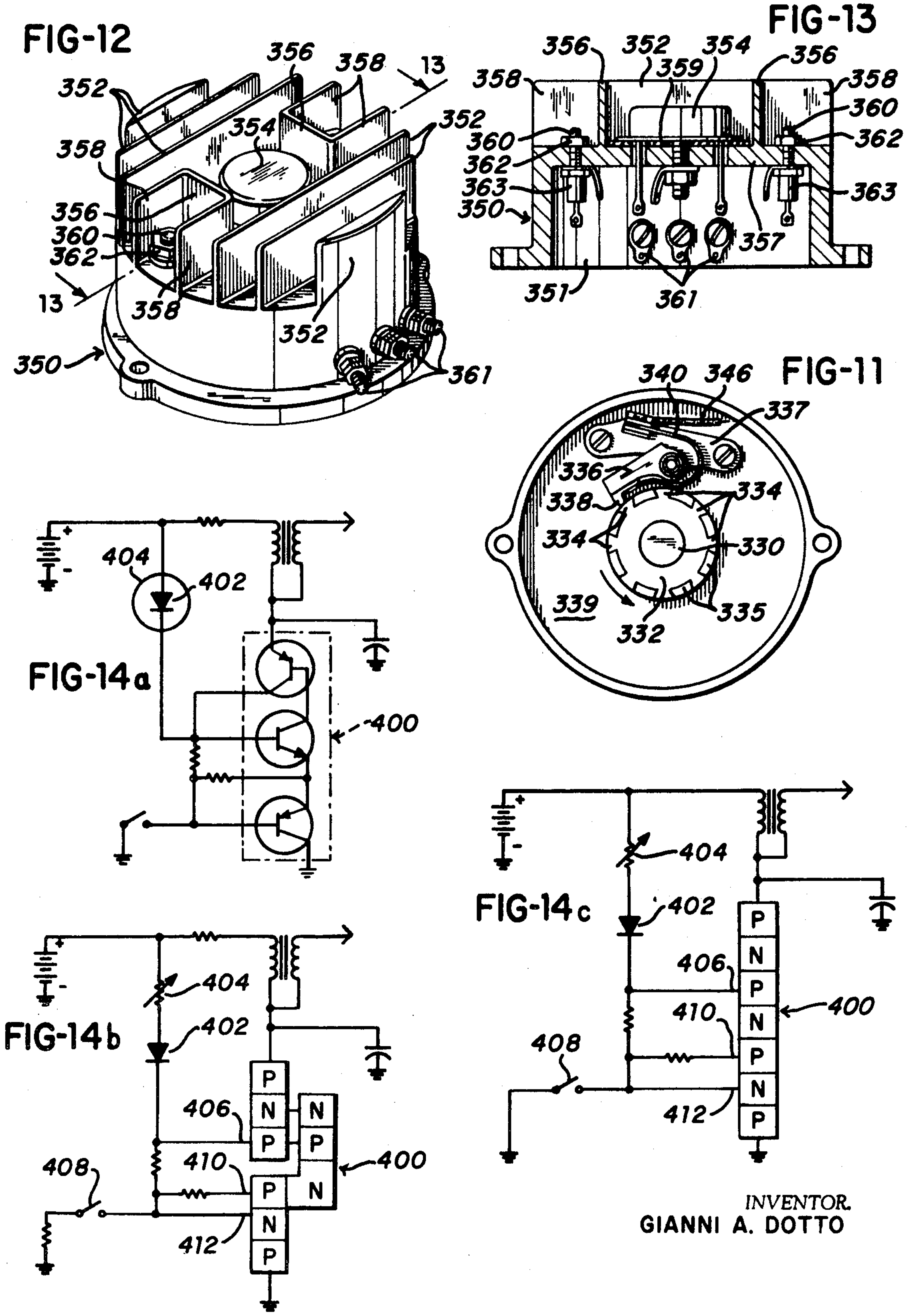

FIG. 11 is a plan view of control switch mechanism of this invention.

FIG. 12 is a perspective view of support and housing structure of ignition control apparatus of this invention.

FIG. 13 is a sectional view taken substantially on line 13—13 of FIG. 12.

FIGS. 14*a*, 14*b*, and 14*c* illustrate the use of a new semiconductor device in ignition control apparatus of this invention. FIG. 14*c* shows a circuit of this invention using a new semiconductor device. FIG. 14*b* illustrates the construction of the new semiconductor device, and FIG. 14*a* illustrates the analogy between the new semiconductor device and a combination of transistors.

Figure 15A:
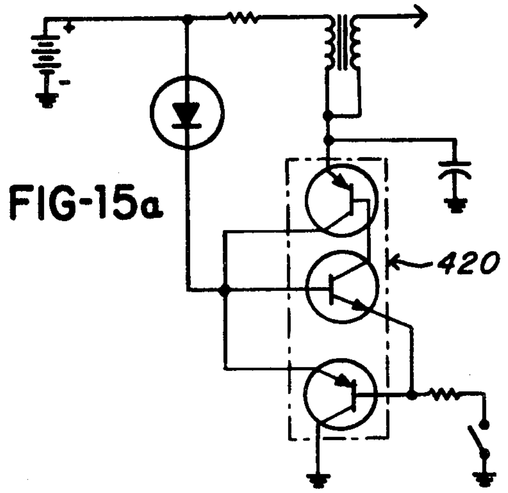
Figure 15B:
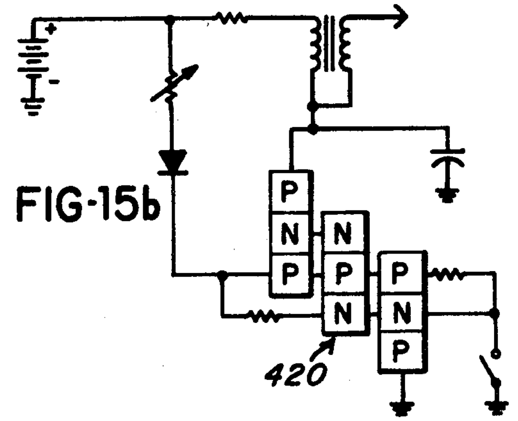
Figure 15C:
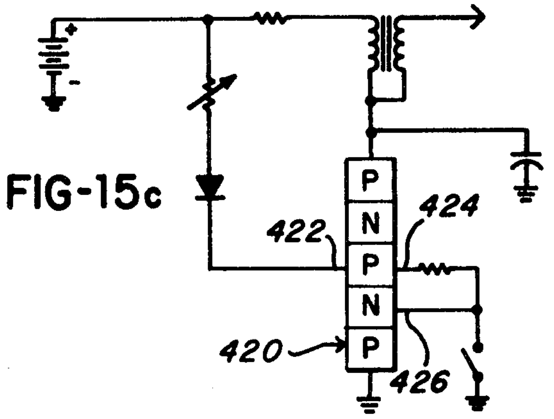

FIGS. 15*a*, 15*b*, and 15*c* illustrate the use of a new semiconductor device in ignition control apparatus of this invention. FIG. 15*c* shows a circuit of this invention using a new semiconductor device. FIG. 15*b* illustrates the construction of the new semiconductor device, and FIG. 15*a* illustrates the analogy between the new semiconductor device and a combination of transistors.

Figure 16:
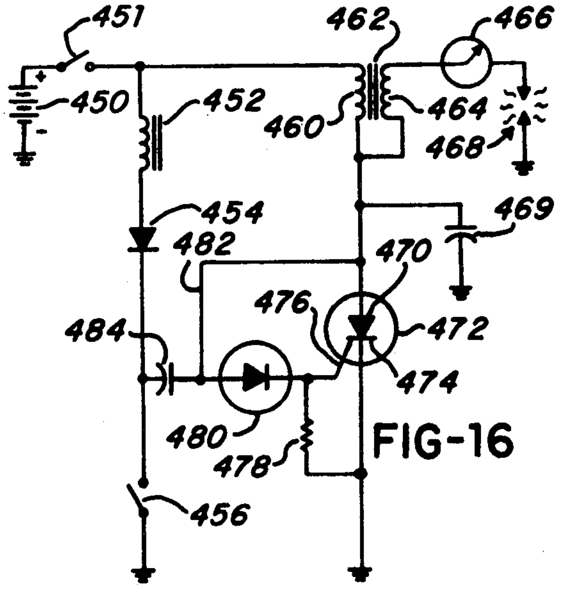

FIG. 16 is a schematic wiring diagram of another modification of the ignition control apparatus of this invention.

Figures 1, 2, 3, 4:
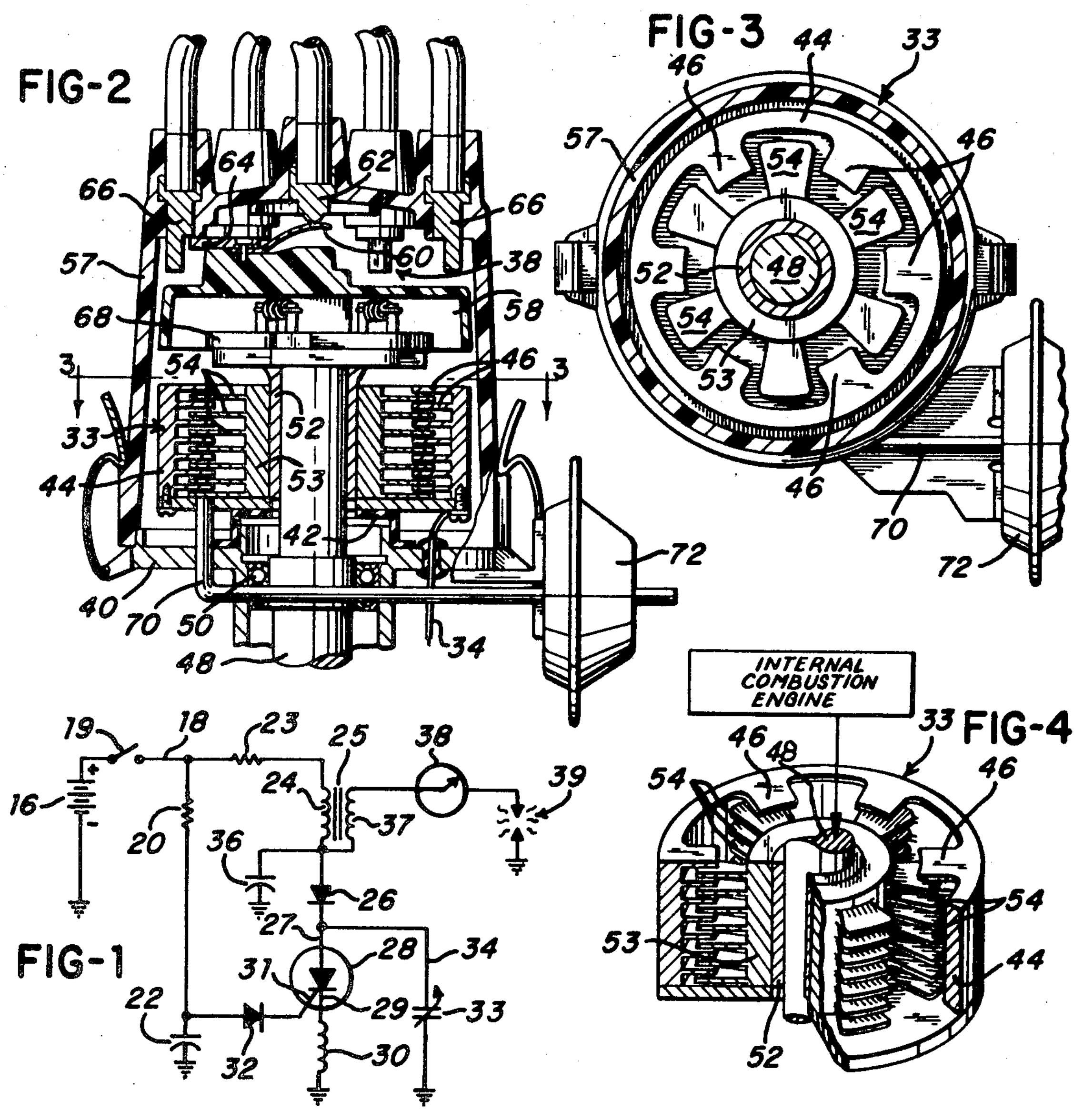
FIG. 1 is a schematic diagram of ignition control apparatus of this invention.
FIG. 2 is a sectional view of rotary capacitor apparatus of this invention.
FIG. 3 is a sectional view taken substantially on line 3—3 of FIG. 2.
FIG. 4 is a fragmentary perspective view of a portion of rotary capacitor apparatus of this invention.

Referring to the drawings in detail, the apparatus of FIG. 1 is illustrated as including a battery 16, which is ordinarily the conventional power supply battery of an automobile. The negative side of the battery 16 is shown as being grounded. The positive side of the battery 16 is connected by means of a conductor 18 to a resistor 20. An ignition switch 19 is shown in the conductor 18. The resistor 20 is connected in series with a capacitor 22 which is connected to ground. Thus, the series of the capacitor 22 and the resistor 20 is connected across the battery 16.

Also, connected to the conductor 18 is a ballast resistor or impedance member 23 to which is series connected a primary winding 24 of an ignition coil or transformer 25. The ignition coil may be a conventional ignition coil used in a present day ignition system. A diode 26 is shown as being connected to the primary winding 24. The diode 26 is also connected to an anode 27 of a controlled rectifier 28.

The controlled rectifier 28 is preferably of a known type of semiconductor device referred to as a silicon controlled rectifier, ordinarily consisting of a plurality of successive zones, usually four zones, of alternate P and N material, there being a junction separating adjoining zones.

The controlled rectifier 28 has a cathode 29 at the end thereof opposite the anode 27. The cathode 29 is connected to ground through an inductance element of impedance member or coil 30. The controlled rectifier 28 also has an intermediate junction or control electrode or gate 31. The controlled rectifier 28 is of the type which is ordinarily initiated into a conductive state by passing a given value of current through the gate 31. However, after conduction of current through the device is begun, the current continues to flow therethrough until the current decreases below a certain holding current value or until the voltage across the controlled rectifier is reversed.

Connected to the juncture between the resistor 20 and the capacitor 22 is a diode 32 which also is connected to the gate 31.

A rotary capacitor 33, discussed below, is connected by means of a conductor 34 to the anode 27 of the controlled rectifier 28. The rotary capacitor 33 is also connected to ground.

A capacitor 36 is shown connecting the primary winding 24 of the ignition coil or transformer 25 to ground. The capacitor 36 may be a capacitor used in a conventional ignition system.

The ignition coil 25 may be of a conventional type and has a secondary winding 37 which is shown as being joined to the primary winding 24 and to the capacitor 36. The primary winding 24 and the secondary winding 37 of the ignition coil or transformer 25 are wound on a common core. The secondary winding 37 connects through any suitable distributor mechanism 38 to a spark plug 39 or to any other suitable element having a desired spark gap within a combustion chamber of an internal combustion engine. The distributor mechanism 38 is further discussed below. The spark plug 39 is also connected to ground in a conventional manner.

THE ROTARY CAPACITOR

The rotary capacitor, referred to by numeral 33, is shown structurally in FIGS. 2, 3, and 4. The rotary capacitor 33 is adapted to replace a conventional breaker point switch mechanism in a conventional ignition system. The rotary capacitor 33 has a frame 40 which, by means of an insulating support member 42, supports an elongate annular member 44 which has a plurality of inwardly extending plates 46. The plates 46 are preferably arranged in equally spaced-apart stacks around the inner wall of the member 44, as shown in FIG. 3. Each stack of plates 46 extends axially within the annular member 44. The plates 46 in each stack thereof are aligned and spaced-apart, as shown in FIG. 4.

A rotary shaft 48, journalled within a bearing 50, rotatably supports a sleeve 52. Secured to the sleeve 52 and rotatable therewith is a hub 53 which carries a plurality of stacks of plates 54, so that there is one plate 54 movable between two plates 46 in each of the stacks thereof. The number of stacks of plates 46 and of plates 54 is shown as being equal. However, the number of stacks of plates 46 may be greater or smaller than the number of stacks of plates 54. Preferably, the number of stacks of plates 46 and the number of stacks of plates 54 is in a given ratio to the number of combustion chambers of the internal combustion engine with which the apparatus is associated.

The shaft 48 is adapted to be attached to suitable mechanism of the engine for rotative movement therewith. Herein, the shaft 48 provides the ground connection of the rotary capacitor 33. However, connection may be made in any other suitable manner. The conductor 34 is connected to the annular member 44 and, as discussed above, is connected to the anode 27 of the silicon controlled rectifier 28.

A cover member 57 has at the upper portion thereof the distributor mechanism 38, mentioned above. An insulated carrier member 58 is attached to the shaft 48 for rotation therewith adjacent the upper portion of the cover member 57. The carrier member 58 supports a contact member 60 which resiliently engages a center stud 62. The contact member 60 also has a tip 64 which moves to closely spaced relationship with any one of a plurality of studs 66 to provide a circuit therewith. Each of the studs 66 connects to one of the cylinders of the engine for distribution of high voltage thereto from the secondary winding 37 of the ignition coil 25.

Also, attached to the shaft 48 is a conventional type of centrifugally operated mechanical advance mechanism 68 which rotates the hub 53 slightly with respect to the shaft 48 when a given speed of rotation of the shaft 48 is obtained. Connected to the annular member 44 is rod 70 of a conventional type of vacuum advance mechanism 72.

When the ignition switch 19 is closed, current passes through the resistor or impedance member 20 and charges the capacitor 22. The time required for charging the capacitor 22 is, of course, determined by the values of the resistor 20 and the capacitor 22. After the capacitor 22 is charged to a predetermined degree, there is a flow of current of a predetermined amount through the diode 32 and through the gate 31 of the controlled rectifier 28. This current flow causes the controlled rectifier to assume a conductive state and to conduct current therethrough. Thus, current flows through the primary winding 24 of the ignition coil 25, through the diode 26, through the controlled rectifier 28, and through the inductance element or coil 30.

This flow of current begins when the rotary capacitor 33 has the rotary plates 54 thereof in the positions shown in FIG. 3. However, with operation of the engine to which the shaft 48 of the rotary capacitor 33 is connected, the shaft 48 rotates and moves the stacks of plates 54 to positions within the stacks of plates 46, as shown in FIG. 4. When such position of the plates 54 is obtained, the maximum capacitance of the rotary capacitor is obtained.

Preferably, the coil 30 and the rotary capacitor 33 are constructed so that the inductive reactance of the coil 30 is equal to the capacitive reactance of the rotary capacitor 33. Therefore, as the plates 54 approach the positions thereof as shown in FIG. 4, an oscillatory current of considerable value is established between the rotary capacitor 33 and the coil 30. As such oscillatory current is established between the coil 30 and the rotary capacitor 33, such oscillatory current flows through the controlled rectifier device 28.

As stated above, one method of stopping conduction of current through a controlled rectifier device, such as the device 28, is that of applying a reverse voltage across the device. Thus, within a cycle after the oscillatory current is established, a half cycle of of voltage occurs across the controlled rectifier 28 which is opposite to the normal voltage thereacross. Such voltage in the reverse direction instantaneously causes the controlled rectifier device 28 to become nonconductive.

With the use of the diode 26 which is in series with the controlled rectifier 28 and which is connected to the capacitor 33, a greater voltage charge is created upon the capacitor 33 than would otherwise be possible. This is a result of the choke action of the winding 24 "held" by the diode 26. This causes a very rapid response of the tank circuit action of the capacitor 33 and the coil 30 to make the controlled rectifier 28 nonconductive when the capacitor 33 approaches its maximum capacity position as shown in FIG. 4.

As the circuit through the controlled rectifier 28 is instantaneously opened, there is a sudden collapse of the magnetic field in the core of the ignition coil 25 and a high voltage is induced in the secondary winding 37. This high voltage in the secondary winding 37 causes a spark across the spark gap of the spark plug 39 which is connected to the secondary winding 37 through the distributor mechanism 38.

It is to be understood that the shaft 48 of the rotary capacitor 33 continuously rotates with operation of the engine to which the apparatus of this invention is associated. The shaft 48 of the rotary capacitor 33 continues to rotate and the plates 46 and 54 again appear as shown in FIG. 3. The shaft 48 continues to rotate so that the plates 46 and 54 again appear in the manner shown in FIG. 4 as the distributor mechanism 38 moves to initiate firing in another cylinder of the engine.

FIGURE 5

Figure 5:
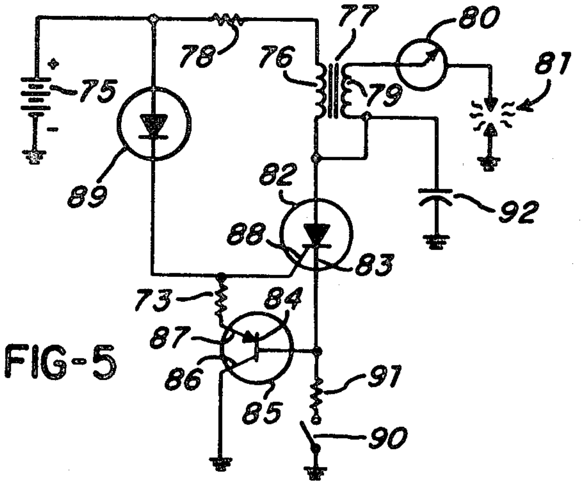

The apparatus of this invention as shown in FIG. 5 comprises a battery 75 which is connected to a primary winding 76 of an ignition coil 77 by means of a ballast resistor 78. The ignition coil or transformer 77 has a secondary winding 79. The secondary winding 79 is connected by any suitable distributor means 80 to spark gap means 81 which is also connected to ground. A controlled rectifier 82 is connected in series with the primary winding 76 of the ignition coil or transformer. The controlled rectifier 82 has a cathode 83 connected to a base 84 of a transistor 85. The transistor 85 has a collector 86 connected to ground. The transistor 85 has an emitter 87 connected by means of a resistor 73 to a gate 88 of the controlled rectifier 82. The gate 88 of the controlled rectifier 82 is connected to the battery 75 through a diode 89.

The diode 89 is preferably of a type known as a Thyrector, which is a trademark of General Electric Company. The Thyrector has the characteristic of serving as a high resistance until a given value of voltage is applied thereacross. When such given value of voltage is applied across the diode 89 the resistance thereof in a forward direction instantaneously decreases to a value which is comparatively small.

The base 84 of the transistor 85 is connected to a breaker point switch 90 through a resistor 91. The breaker point switch 90 may be the conventional breaker point switch or other suitable switch mechanism. A new type of such a switch is discussed below.

When the breaker point switch 90 is closed, the resistance of the transistor 85 is shorted out and sufficient voltage is applied across the diode 89 to cause the resistance thereof to decrease so that sufficient current flows through the gate 88 of the controlled rectifier 82 to place the controlled rectifier 82 in a conductive state. The transistor 85 also assumes a conductive state. Therefore, current flows through the primary winding 76 of the ignition coil 77, through the controlled rectifier 82, through the transistor 85, and to the negative side of the batter 75 through ground.

When the breaker point switch 90 is opened, the transistor 85 immediately assumes a nonconductive state and there is a sudden substantial decrease in the flow of current through the controlled rectifier 82. There is sudden collapse of substantially of the magnetic field of the core of the ignition coil 77. It has been found that within a few microseconds after such opening of the breaker point switch 90, a reverse voltage occurs across the controlled rectifier 82 which instantaneously causes the controlled rectifier 82 to be nonconductive. Thus, the circuit between the primary winding 76 and the transistor 85 is opened.

The sudden collapse of the magnetic field in the ignition coil 77 and the opening of the circuit through the controlled rectifier 82 creates a high voltage across the primary winding 76, which induces a high voltage across the secondary winding 79 of the ignition coil 77, causing a spark across the spark gap means 81.

An oscillatory current exists between the primary winding 76 and the capacitor 92 for a short period after the controlled rectifier 82 becomes nonconductive.

Due to the fact that the controlled rectifier 82 becomes nonconductive almost immediately after the breaker point switch opens, the transistor 85 is protected against the high voltage which occurs in the primary winding 76 as the magnetic field collapses and during the voltage oscillations which follow.

The value of the capacitor 92 has an effect upon the time required for sufficient reverse voltage to be created across the controlled rectifier 82 to cause nonconduction thereof. The value of the capacitor 92 is selected so that the controlled rectifier 82 is free to become nonconductive after the breaker point switch opens. In this manner, the peak of the voltage becomes much greater than would otherwise occur. Furthermore, of course, the transistor 85 is well protected from such voltages.

As stated above, the diode 89 is preferably of the type which has a high resistance until a given voltage is applied thereacross. This characteristic of the diode 89 makes it ideal as means to prevent "firing" of the controlled rectifier 82 until the breaker point switch 90 is closed. After such closing of the breaker point switch 90 occurs, the voltage across the diode 89 becomes such that there is more than sufficient flow of current therethrough and through the gate 88 of the controlled rectifier 82 to produce a state of conductivity in the controlled rectifier 82. Thus, even when ambient temperature conditions change greatly, the controlled rectifier 82 is readily and consistently made conductive at the desired instant.

FIGURE 6

Figures 6, 7:
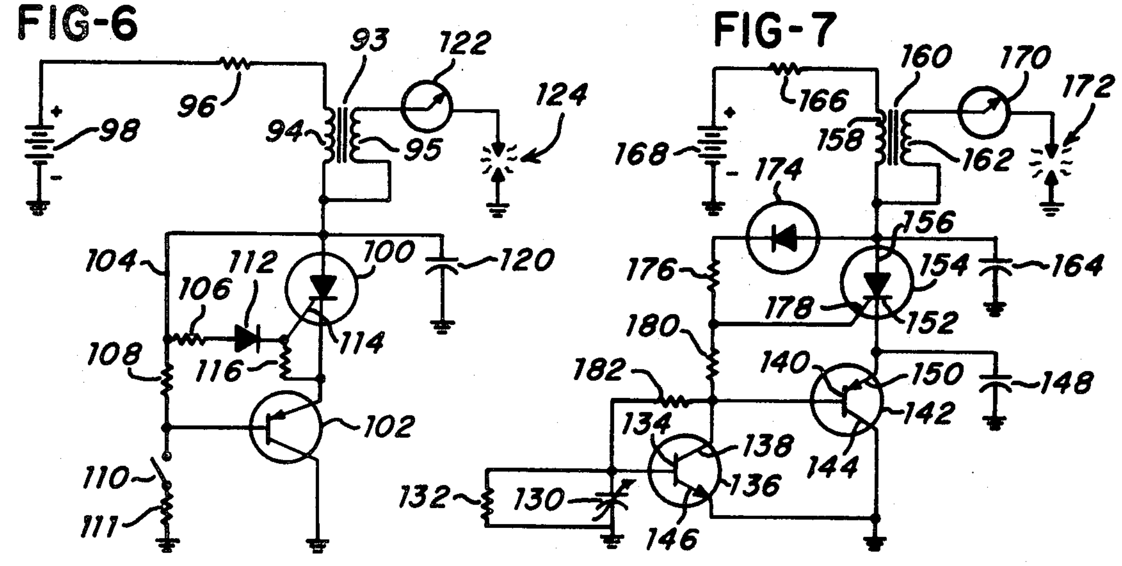

The apparatus of this invention as shown in FIG. 6 includes an ignition coil or transformer 93 having a primary winding 94 and a secondary winding 95. A ballast resistor 96 connects a battery 98 to the primary winding 94. One side of the batter 98 is shown as being grounded. A semiconductor device 100 of the controlled rectifier type, discussed above, is in series with the primary winding 94.

Connected in series with the controlled rectifier 100 is another semiconductor device in the form of a transistor 102, herein shown as being of a P-N-P type of transistor. A conductor 104 is connected to the juncture between the silicon controlled rectifier 100 and the primary winding 94 and is also connected to a resistor 106 and to a resistor 108. The resistor 108 is in series with a breaker point switch 110 which is connected to ground through a resistor 111. The breaker point switch 110 opens and closes in timed operation with the engine and may be of a conventional type or may be of a type discussed below.

The resistor 106 has in series therewith a diode 112 which connects to a gate or control element 114 of the controlled rectifier 100. A resistor 116 joins the diode 112 to the transistor 102. The primary winding 94 and the secondary winding 95 have a common junction which is shown as being connected to ground through a capacitor 120. The secondary winding 95 has in series therewith any suitable distributor mechanism 122, and spark gap means 124 of a combustion chamber of the engine is in series with the distributor mechanism 122.

The breaker point switch 110 provides means for coupling the base of the transistor 102 to ground. Normally the breaker point switch 110 is open. Thus, the base of the transistor 102 is biased so that there is no appreciable conduction therethrough. When the breaker point switch 110 closes, the base and collector of the transistor 102 have such relative potentials that the transistor 102 is placed in a conductive state. This conduction causes flow of sufficient current through the gate 114 of the controlled rectifier 114 to cause conduction thereof. Thus, there is flow of current through the controlled rectifier 114 and through the primary winding 94 of the ignition coil 93. Current also flows through the transistor 102 to ground.

When the breaker point switch 110 is opened, the transistor 102 immediately assumes a nonconducting state. The current through the primary winding 94 immediately greatly decreases in value. The magnetic field of the core of the ignition coil 93 begins to collapse. As stated above, with a few microseconds after the breaker point switch 110 opens a reverse voltage occurs across the controlled rectifier 100 and the controlled rectifier 100 instantaneously becomes nonconductive. As the magnetic field of the core of the ignition coil 93 continues to collapse, the transistor 102 is protected from the high surge of voltage which occurs in the primary winding 94 and which induces a high voltage in the secondary winding 95, causing a spark across the spark gap means 124.

As discussed above, after the initial voltage surge in the primary winding 94 occurs, there are current and voltage oscillations in the primary winding 94 and in the capacitor 120 which rapidly diminish before the breaker point switch 110 again closes.

FIGURE 7

FIG. 7 shows an ignition control circuit of this invention in which a rotary capacitor 130, similar to the rotary capacitor 33, discussed above, is used. The rotary capacitor 130 is shown as having a resistor 132 connected thereacross. The rotary capacitor 130 is connected to a base 134 of a transistor 135, herein shown as being of the N-P-N type. The transistor 136 has a collector 138 which is connected to a base 140 of a transistor 142, shown as being of the P-N-P type. The transistor 142 has a collector 144 connected to an emitter 146 of the transistor 136, both of which are connected to ground.

A capacitor 148 joins an emitter 150 of the transistor 142 to ground.

The emitter 150 of the transistor 142 is connected to a cathode 152 of a controlled rectifier 154. The controlled rectifier 154 has an anode 156 connected to a primary winding 158 of an ignition coil 160. The ignition coil 160 has a secondary winding 162. A common lead of the primary winding 158 and of the secondary winding 162 is joined to a capacitor 164 which is also connected to ground.

The primary winding 158 is connected through a resistor 166 to a battery 168. The secondary winding 162 is connected through any suitable distributor mechanism 170 to spark plug or spark gap means 172 of a combustion chamber.

A diode 174 connects through a series resistor 176 to a gate 178 of the controlled rectifier 154. The diode 174 may be of the Thyrector type described above or may be of any other suitable type having the non-linear characteristics of a high resistance until a given voltage is applied thereacross and a comparatively low resistance with a given voltage thereacross.

A resistor 180 joins the resistor 176 to the collector 138 of the transistor 136 and to the base 140 of the transistor 142. A resistor 182 joins the resistor 180 to the rotary capacitor 130.

The rotary capacitor 130 is used to control conduction of the transistor 136, which in turn, controls conduction of the transistor 142. The rotary capacitor 130 is connected to the engine for operation therewith for proper timing of the ignition in each combustion chamber. The rotary capacitor 130 provides means for coupling the base 134 of the transistor 136 to ground. Rotation of the rotary capacitor 130 results in changes from maximum to minimum capacitance of the rotary capacitor 130.

When there is maximum capacitance of the capacitor 130, the bias on the base 134 of the transistor 136 is changed and there is flow of current through the transistors 136 and 142 and through the controlled rectifier 154 and through the primary winding 158. When the rotary capacitor 130 is rotated to a position of minimum capacitance the transistors 136 and 142 assume conditions of nonconductance.

When such a nonconductance condition of the transistor 142 occurs, collapse of the magnetic field in the core of the ignition coil 158 occurs. As stated above, with a few microseconds following the time that the transistor 142 assumes a nonconductive condition, a reverse voltage across the controlled rectifier 154 occurs which causes the controlled rectifier 154 to be nonconductive. Thus, as discussed above, the transistor 142 is protected from the high voltage surge which occurs in the primary winding 158 and which causes high operating voltage in the secondary winding 162. The transistor 142 is also protected from the voltage oscillations which occur in the capacitor 164 and in the primary winding 158 after a spark is created across the spark gap means 172.

The capacitor 148 aids in applying desired bias voltage to the transistor 142.

FIGURE 8

Figure 8:
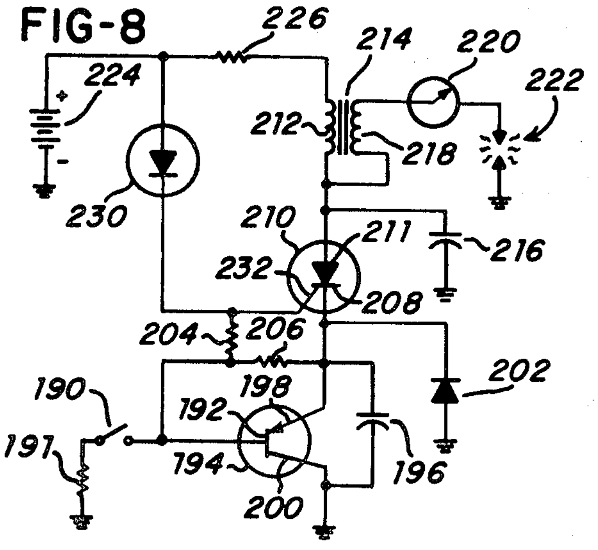

The apparatus of this invention as disclosed in FIG. 8 comprises a breaker point switch 190 which is connected to ground through a resistor 191 and which is also joined to a base 192 of a transistor 194. A capacitor 196 is shown as being connected from an emitter 198 of the transistor 194 to a collector 200 thereof. The collector 200 is also joined to ground. A diode 202 is shown as being connected in parallel with the capacitor 196. The capacitor 196 and the diode 202 provide better bias voltage conditions to the emitter 198 of the transistor 194. The capacitor 196 and the diode 202 also provide means by which energy may flow to the controlled rectifier for providing a reverse voltage thereto. With the use of certain types or sizes of transistors, the capacitor 196 and/or the diode 202 may not be necessary in the circuit.

Resistors 204 and 206 are joined in series and connected from the emitter 198 of the transistor 194 to a gate 232 of a controlled rectifier 210. A cathode 208 of the controlled rectifier 210 is connected to the emitter 198 of the transistor 194. An anode 211 of the controlled rectifier 210 is joined to a primary winding 212 of an ignition coil 214. The anode 211 of the controlled rectifier 210 is also connected to a capacitor 216 which is grounded. With the use of a certain types of transistors and/or controlled rectifiers the capacitor 216 may not be necessary in the circuit. If both the capacitor 216 and the capacitor 196 are used, it is preferable that the capacitance of the capacitor 196 be smaller than the capacitance of the capacitor 216.

The ignition coil 214 has a secondary winding 218 which has one end thereof connected to the primary winding 212. The secondary winding 218 is connected by any suitable distributor means 220 to spark gap means or spark plug means 222 which is, in turn, grounded.

The primary winding 212 of the ignition coil 214 also is connected to a battery 224 through a resistor 226. The opposite side of the battery 224 is grounded. The resistor 226 has joined thereto a diode 230 which, may be of the Thyrector type or of any type having the characteristic of a high resistance until a given value of voltage is applied thereacross and a comparatively low forward resistance while a given value of voltage is applied thereacross. The diode 230 is connected to the gate 232 of the controlled rectifier 210. The breaker point switch 190 serves as means to couple the base of the transistor 190 to ground and to provide proper voltage to the base 192 to cause conduction of the transistor 194. When the breaker point switch 190 is closed, the controlled rectifier 210 and the transistor 194 are caused to become conductive. Therefore, a direct current flows through the primary winding 212 of the ignition coil 214.

When the breaker point switch 190 is opened the transistor 194 assumes its nonconductive state and within a few microseconds the controlled rectifier 194 assumes a nonconductive state. Thus, as described above with respect to FIGS. 5, 6, and 7, there is a voltage surge in the primary winding 158 of the ignition coil 160. Because the controlled rectifier 210 210 is nonconductive, the transistor 194 is protected from the high voltage which occurs in the primary winding 212 and which causes high operational voltage in the secondary winding 218.

After the breaker point switch 190 opens and the transistor 194 becomes nonconductive, the capacitor 196, when used in certain sizes with certain types of transistors 194, forms a parallel load circuit with the transistor 194, the parallel circuit being in series with the primary winding 212, through the controlled rectifier 210, and an oscillatory circuit is produced. Thus, after the breaker point switch 190 opens and the transistor 194 assumes a nonconductive resistance condition, an oscillatory voltage is created which quickly produces a reverse voltage across the controlled rectifier 210 and in this manner causes the controlled rectifier 210 to become nonconductive.

FIGURE 9

Figure 9:
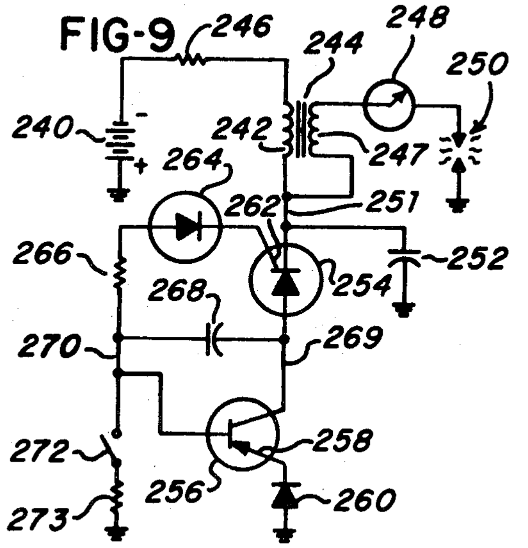

The apparatus of this invention as shown in FIG. 9 is particularly adapted for use in an ignition system in which the positive side of the system is grounded. A battery 240 is shown which has the positive side thereof grounded. The negative side of the battery 240 is connected to a primary winding 242 of an ignition coil or transformer 244 through a ballast resistor 246. The ignition coil or transformer 244 has a secondary winding 247 which is connected through any suitable distributor means 248 to spark gap means 250 which has one side thereof grounded.

The primary winding 242 and the secondary winding 247 have a common lead 251 which is grounded through a capacitor 252.

In series with the primary winding 242 of the ignition coil 244 is a controlled rectifier 254 which is, in turn, connected to a transistor 256. The transistor 256 has an emitter 258 which is connected to a diode 260 which has one side thereof grounded. The controlled rectifier 254 has a gate 262 connected to a diode 264 which is connected in series with a resistor 266. The diode 264 is preferably of the type described above and referred to by the trademark, Thyrector. A resistor 266 is connected to a capacitor 268 which is also connected to a conductor 269 which joins the controlled rectifier 254 and the transistor 256. A conductor 270 is connected to the capacitor 268 and to the base of the transistor 256 and to a breaker point switch 272. A resistor 273 joins the breaker point switch 272 to ground.

When the breaker point switch 272 is closed the transistor 256 becomes conductive so that current flows through the transistor 256 and through the controlled rectifier 254 and through the primary winding 242 of the ignition coil 244. When the breaker point switch 272 is opened the transistor 256 suddenly assumes a nonconductive state. As discussed above, this sudden reduction in current flow through the primary winding 242 causes a voltage surge. Within a few microseconds a reverse voltage occurs across the controlled rectifier 254 causing the controlled rectifier 254 to assume a nonconductive condition. The transistor 256 is thus protected against the high voltage created in the primary winding 242 and which result in induced high voltages in the secondary winding 247. Thus, the high voltage induced in the secondary winding 247 of the ignition coil 244 causes a spark across the spark gap means 250.

It is to be noted that the switching mechanism which comprises the transistor 256 and the controlled rectifier 254, is located between the positive side of the battery 240 and the coil 242, rather than between the negative side of the battery 240 and the winding 242, as in FIGS. 1,5,6,7, and 8. This illustrates that apparatus of this invention is operative whether the switching mechanism, comprising a controlled rectifier and a transistor, is between the negative side of a source of electrical energy and an ignition coil or between the positive side of the source of electrical energy and an ignition coil. The important consideration is that the controlled rectifier is connected between the ignition coil and the transistor so that the controlled rectifier serves as a shield and protects the transistor from high voltages occuring in the ignition coil.

FIGURE 10

Figure 10:
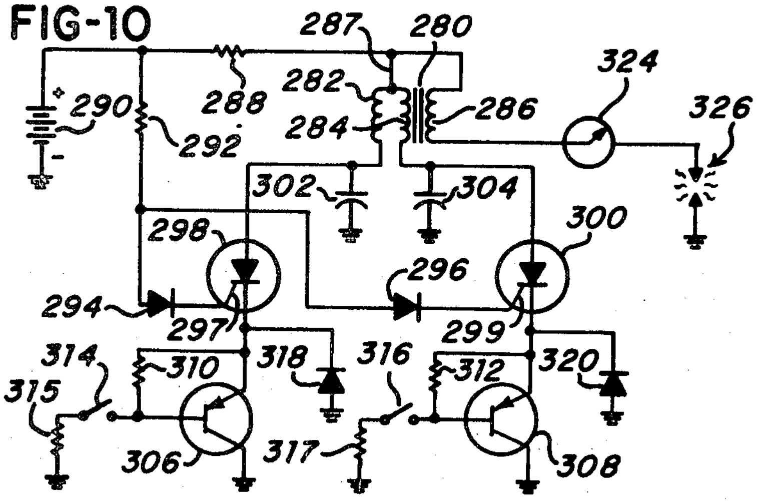

The apparatus of this invention as shown in FIG. 10 comprises circuitry in which an ignition coil or transformer 280 is provided with two primary windings, there being a primary winding 282 and a primary winding 284. The ignition coil 280 also has a secondary winding 286. The windings 282, 284, and 286 are wound on a common core and have a common juncture 287 connected to a ballast resistor 288. The ballast resistor 288 is connected to a battery 290. A resistor 292 is also connected to the battery 290. A diode 294 is connected to the resistor 292 and a diode 296 is connected thereto. The diode 294 is joined to a gate 297 of a controlled rectifier 298 and the diode 296 is connected to a gate 299 of a controlled rectifier 300.

The controlled rectifier 298 is joined to the primary winding 282, and the controlled rectifier 300 is joined to the primary winding 284. The primary winding 282 has a capacitor 302 connected thereto. The primary winding 284 has a capacitor 304 connected thereto. In series with the controlled rectifier 298 is a transistor 306. Connected in series with the controlled rectifier 300 is a transistor 308. The collector of each of the transistors 306 and 308 is connected to ground.

The transistor 306 has a resistor 310 connected from the emitter thereof. The transistor 308 has a resistor 312 connected from the emitter thereof to the base thereof. In series with the resistor 310 is a breaker point switch 314. In series with the resistor 312 is a breaker point switch 316. A resistor 315 is in series with the breaker point switch 314 and a resistor 317 is in series with the breaker point switch 316.

Connected from ground to the emitter of the transistor 306 is a diode 318. Connected from ground to the emitter of the transistor 308 is a diode 320.

In series with the secondary winding 286 is any suitable distributor mechanism 324 which is joined to a spark plug or spark gap means 326 which is also joined to ground.

The primary winding 282 and the primary winding 284 are wound upon the ignition coil or transformer 280 so that when current is flowing from the battery 290 through the primary winding 282, a magnetic field is created in the core of the ignition coil 280 in the opposite direction from the magnetic field created in the core of the ignition coil 280 when the current is flowing from the battery 290 through the primary winding 284.

During operation the breaker point switches 314 and 316 alternately open and close for initiating conductance and nonconductance of the transistors 306 and 308 and of the controlled rectifiers 298 and 300. The controlled rectifiers 298 and 300 operate in the same manner as discussed above. Therefore, there is a complete collapse of the magnetic field in the core of the ignition coil 280 during each cycle of operation of each of the primary windings 282 and 284 and no residual magnetism remains at the instant one of the coils is energized. Thus, a higher voltage in the primary windings 282 and 284 is obtained and a higher voltage in the secondary winding 286 results.

FIGURE 11

FIG. 11 shows switch mechanism in which a rotary shaft 330 has a collar 332 provided with a plurality of conductor portions 334. The conductor portions are separated by nonconductive portions or insulator portions 335.

A contact finger 336 is pivotally attached to support structure 337 and has a contact tip 338 in engagement with the collar 332. The support structure 337 is carried by a plate 339. A spring member 340 urges movement of the finger 336 toward the collar 332.

The mechanism of FIG. 11 is adapted to replace or to be substituted for conventional breaker point switch mechanism. The shaft 330 is adapted to be electrically grounded for a part of an electrical circuit and operable by suitable mechanism of the engine. Preferably, the mechanism of FIG. 11 is provided with mechanical advance means (not shown) and with vacuum advance means (not shown) in a manner in which conventional breaker point switch mechanisms are so provided.

The contact finger 336 has an electrical connection lead 346 extending therefrom for connection to any element as desired.

Rotation of the collar 332 by means of the shaft 330 causes movement of the contact portions 334 and the insulated portions 335 so that at any given time either a portion 334 or a portion 335 is in engagement with the tip 338 of the finger 336. Thus, with rotation of the shaft 330 there is opening and closing of the circuit between the shaft 330 and the lead 346. Thus, when the mechanism of FIG. 11 replaces a conventional breaker point switch, the circuit which controls spark ignition has no moving contacts which bounce upon impact and which frequently touch and carry current in only small portions thereof as occurs with a conventional breaker point switch. The switch of this invention shown in FIG. 11 operates smoothly as the tip 338 remains in engagement with the collar 332.

FIGURES 12 AND 13

FIGS. 12 and 13 show support and housing structure for any of the circuits shown in the diagrammatic figures discussed above. The support and housing structure also serves as a radiator means for a transistor and for other devices attached thereto. A housing 350 has a cavity 351 therewithin and is provided with a plurality of radiator fins 352, of various lengths, extending in substantially parallel relation. The housing 350 is adapted to support a transistor 354 intermediate two transversely extending fins 356. The transistor 354 is attached to a wall 357 of the housing 350. The transistor 354 is shown as being in engagement with a small sheet of heat conductive material 359.

A plurality of terminals 361 extend into the cavity 351 for use as connection members. Each of the fins 356 is joined to a pair of short fins 358 which are parallel to the fins 352.

A stud 360 extends from the cavity 351 through the wall 357 of the housing 350 and into the area formed by each fin 356 and its adjoining fins 358. Each stud 360 is shown as having a nut 362. The stud 360 is adapted to support any of the elements such as a controlled rectifier 363 within the cavity 351 of the housing 350.

A controlled rectifier, such as 363 and the other devices discussed above, produces high frequency voltages which cause radio frequency interference. However, in the structure of this invention the transverse fins 356 protect the transistor 354 from any high frequency voltages of the controlled rectifier 363. The fins 352, 356, and 358 also, of course, provide excellent heat transfer from the transistor 354.

FIGURES 14*a*, 14*b*, and 14*c*

FIG. 14*c* illustrates the use of a new semiconductor device 400 which has a plurality of P and N zones and which has a plurality of intermediate junctions. Thus, the semiconductor device can be adapted to a circuit such as shown in FIGS. 6 and 8 and as discussed above.

The semiconductor device 400 serves both as a controlled rectifier and as a transistor.

A diode 402 and an adjustable resistor 404 in series therewith are connected in series with a gate 406. A breaker point switch 408 serves to open and to close a circuit from ground to junctions 410 and 412 of the semiconductor device 400.

FIG. 14*b* illustrates the construction of the semiconductor device 400. FIG. 14*a* illustrates the analogy between the semiconductor device 404 and a plurality of transistors. FIG. 14*a* also shows the analogy between the diode of the Thyrector type having the characteristics discussed above and a series combination of the adjustable resistor 404 and a conventional diode 402.

FIGURES 15*a*, 15*b*, and 15*c*

FIG. 15*c* shows the use of a new semiconductor device 420 which has a plurality of P and N zones and which may be used in a circuit such as shown in FIG. 5 and which serves as both a controlled rectifier and as a transistor. The semiconductor device 420 has a gate junction 422 and base junctions 424 and 426.

FIG. 15*b* illustrates the construction of the semiconductor device 420 and FIG. 15*a* illustrates the analogy between the semiconductor device 420 and a plurality of transistors.

FIGURE 16

FIG. 16 shows another modification in the ignition control apparatus of this invention. A battery 450 is shown as having the positive side thereof connected to a conventional ignition switch 451. The ignition switch 451 is connected to a choke 452 which has a diode 454 in series therewith. The opposite side of the battery 450 is grounded. A breaker point switch 456 joins the diode 454 to ground.

Also connected to the positive side of the battery 450 is a primary winding 460 of an ignition coil 462. The ignition coil 462 has a secondary winding 363 which is connected through suitable distributor means 466 to spark gap means 468, which is joined to ground. A capacitor 469 connects the windings 460 and 464 to ground.

The primary winding 460 is connected to an anode 470 of a controlled rectifier 472. A cathode 474 of the controlled rectifier 472 is connected to ground. The controlled rectifier 472 has a gate or control element 476 which is connected to ground through a resistor 478. A diode 480 is also connected to the gate 476. The diode 480 is preferably of the type, discussed above, which has the characteristic of being a high value resistor until a given voltage is applied thereacross and a relatively low value resistor when a given value of voltage is applied thereacross.

A conductor 482 connects the diode 480 to the anode 470 of the controlled rectifier 472. A capacitor 484 joins the diode 480 to the diode 454.

When the ignition switch 451 is closed, a circuit is established through the primary winding 460, through the conductor 482, through the diode 480, and through the gate 476. Because the voltage applied across the diode 480 is sufficiently high, the resistance thereof is relatively low. Therefore, sufficient current flows through the gate 476 that the controlled rectifier 472 becomes conductive. Thus, there is an increasing flow of current through the primary winding 460 until the core of the ignition coil 462 becomes saturated.

The flow of current through the primary winding 460 results in such a voltage drop across the primary winding 460 that the voltage across the diode 480 decreases to such an extent that the diode 480 becomes a high value resistor. Thus, the current therethrough decreases to such an extent that the current through the gate 476 is insufficient to cause the controlled rectifier 472 to be in its conductive state. However, the flow of current through the controlled rectifier 472 is sufficient to maintain the controlled rectifier 472 in its conductive state.

Such action in the controlled rectifier 472 occurs whether the breaker point switch 456 is open or closed. However, when the breaker point switch 456 is open while current is so flowing through the controlled rectifier 472, the capacitor 484 becomes charged to approximately twice the voltage of the battery 450, because of the choke 452 and the diode 454 which are also in the circuit. Therefore, when the breaker point switch 456 again closes, there is a discharge of the capacitor 484. This discharge of the capacitor 484 momentarily causes the cathode 474 of the controlled rectifier 472 to be more positive by several volts than the anode 470. Therefore, the controlled rectifier 472 instantaneously becomes nonconductive and the flow of current through the primary winding 460 suddenly stops. Thus, a voltage is created across the primary winding 460 which induces a high voltage across the secondary winding 464 so that a spark occurs across the spark gap means 468.

It is to be understood that the apparatus of this invention comprises means by which a transistor which is capable of withstanding comparatively low voltages can be used to control a load in a high voltage circuit. Semiconductor controlled rectifier means in series with a transistor, as shown in several of the figures of the drawings, serves as voltage divider means. Thus, a transistor in series with the semiconductor controlled rectifier means makes possible control of high voltage energy. For example, as illustrated in the several figures of the drawings, a transistor is connected in series with a controlled rectifier which is connected to a load in which high voltage energy occurs. However, due to the fact that a semiconductor controlled rectifier is in series with the transistor, the transistor which has comparatively low voltage ratings is capable of controlling flow of electrical energy in the load. Thus, the apparatus of this invention is capable of high voltage energy control in circuits other than automotive ignition circuits.

Also, the apparatus of this invention in which a semiconductor rectifier is used in combination with a transistor provides means by which the combination serves as a thyratron type of device. The gate or control element of the semiconductor rectifier does not have control over the values of current flow through the device. The gate merely serves as a means to initiate current flow through the semiconductor device.

However, a transistor in series with the semiconductor device provides means by which the value of current flow through the semiconductor device is controlled.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

I claim

1. An electrical component support means comprising:

a. a cup-shaped housing including a base portion having an outer and inner surface, and a side wall extending around and from said inner surface so as to provide a cavity with said inner surface, b. a pair of U-shaped fins extending from said outer surface at its center portion in spaced back-to-back relationship, c. a pair of opposed fins extending from said outer surface and from a portion of said side wall substantially parallel to said pair of U-shaped fins, and d. a plurality of spaced parallel fins extending from said outer surface between and substantially parallel to said U-shaped fins and said pair of opposed fins.

2. An electrical component support means according to claim 1 further comprising stud means carried by and extending through said wall providing support means for electrical components.

3. An electrical component support means according to claim 1 further comprising electrical terminals extending into said housing.

* * * * *

UNITED STATES PATENT OFFICE

CERTIFICATE OF CORRECTION

Patent No. 3,716,098  Dated February 13, 1973

Inventor(s) Gianni A. Dotto

It is certified that error appears in the above-identified patent and that said Letters Patent are hereby corrected as shown below:

Col. 2, line 21, Change "coil may" to "coil 25 may".

Col. 2, line 34, Change "element of" to "element or".

Col. 3, line 59, Change "is rod" to "is a rod".

Col. 5, line 49, Change "of the" to "all of the".

Col. 6, line 36, Change "batter" to "battery".

Col. 7, line 15, Change "with" to "within".

Col. 8, line 27, Change "with" to "within".

Col. 9, line 38, Delete one of the 210's.

Col. 10, line 34, Change "voltage" to "voltages".

Col. 11, line 16, after "thereof" insert "to the base thereof".

Col. 11, line 61, Change "engatement" to "engagement".

Signed and sealed this 3rd day of July 1973.

(SEAL)
Attest:

EDWARD M.FLETCHER,JR.
Attesting Officer

Rene Tegtmeyer
Acting Commissioner of Patents